July 16, 1968

W. F. SHOOP 3,393,366

HIGH PRECISION MOTOR SPEED CONTROL CIRCUIT UTILIZING
BINARY COUNTERS AND DIGITAL LOGIC

Filed June 5, 1964

INVENTOR:
WILLIAM F. SHOOP,
BY
AGENT.

Fig.3.

TABLE I

| TIME | CASE: 1 A=S₃ N/C | B=S₂ N/C | C=S₁ N/C | CASE: 2 A=S₃ N/C | B=S₂ N/C | C=S₁ N/C | | CASE: 3 A=S₃ N/C | B=S₂ N/C | C=S₁ N/C | | CASE: 4 A=S₃ N/C | B=S₂ N/C | C=S₁ N/C | |
|---|---|---|---|---|---|---|---|---|---|---|---|---|---|---|---|
| 0  | 0 | 0 | 0 | 0 | 0 | 0 | | 0 | 0 | 0 | | 0 | 0 | 0 | |
| 1  | 0 | 0 | 1 | 0 | 0 | 1 | | 0 | 0 | 1 | | 0 | 0 | 1 | |
| 2  | 0 | 1 | 0 | 0 | 1 | 0 | | 0 | 1 | 0 | | 0 | 1 | 0 | |
| 3  | 0 | 1 | 1 | 0 | 1 | 1 | | 0 | 1 | 1 | | 0 | 1 | 1 | |
| 4  | 1 | 0 | 0 | 1 | 0 | 0 | | 1 | 0 | 0 | | 1 | 0 | 0 | |
| 5  | 1 | 0 | 1 | 1 | 0 | 1 | | 1 | 0 | 1 | | 1 | 0 | 1 | |
| 6  | 1 | 1 | 0 | 1 | 1 | 0 | | 1 | 1 | 0 | | 1 | 1 | 0 | |
| 7  | 1 | 1 | 1 →RESET 1 1 1 | | 1 | 1 | 1 →RESET 0 1 0 | | 1 | 1 | 1 →RESET 0 1 1 | | 1 | 1 | 1 →RESET 0 0 0 |
| 8  | | 0 | 0 | 0 | | 0 | 1 | 1 | | 1 | 0 | 0 | | 0 | 0 | 1 |
| 9  | | 0 | 0 | 1 | | 1 | 0 | 0 | | 1 | 0 | 1 | | 0 | 1 | 0 |
| 10 | | 0 | 1 | 0 | | 1 | 0 | 1 →RESET | | 1 | 1 | 0 | | 0 | 1 | 1 |
| 11 | | 0 | 1 | 1 | | 1 | 1 | 0 | 0 | 1 | 1 →RESET 1 1 1 | | 1 | 0 | 0 |
| 12 | | 1 | 0 | 0 | 0 | 1 | 0 →RESET 1 1 1 | | 1 | 0 | 0 | | | 1 | 0 | 1 |
| 13 | | 1 | 0 | 1 | 0 | 1 | 1 | | 1 | 0 | 1 | | | 1 | 1 | 0 |
| 14 | | 1 | 1 | 0 | 1 | 0 | 0 | | 1 | 1 | 0 | | 0 | 0 | 0 →RESET 1 1 1 |
| 15 | 1 1 1 →RESET 1 1 1 | | | 1 | 0 | 1 | | 1 | 1 | 1 →RESET 0 1 1 | | 0 | 0 | 1 | |
| 16 | 0 | 0 | 0 | 1 | 1 | 0 →RESET | | | 1 | 0 | 0 | 0 | 1 | 0 | |
| 17 | 0 | 0 | 1 | 1 | 1 | 1 →RESET 0 1 0 | | | 1 | 0 | 1 | 0 | 1 | 1 | |
| 18 | 0 | 1 | 0 | | 0 | 1 | 1 | | 1 | 1 | 0 | 1 | 0 | 0 | |
| 19 | 0 | 1 | 1 | | 1 | 0 | 0 | 0 | 1 | 1 →RESET 1 1 1 | | 1 | 0 | 1 | |
| 20 | 1 | 0 | 0 | | 1 | 0 | 1 | 1 | 0 | 0 | | 1 | 1 | 0 | |
| 21 | 1 | 0 | 1 | | 1 | 1 | 0 →RESET | 1 | 0 | 1 | | 1 | 1 | 1 →RESET 0 0 0 |
| 22 | 1 | 1 | 0 →RESET | 0 | 1 | 0 →RESET 1 1 1 | | 1 | 1 | 0 →RESET | | | 0 | 0 | 1 |
| 23 | 1 | 1 | 1 →RESET 1 1 1 | 0 | 1 | 1 | | 1 | 1 | 1 →RESET 0 1 1 | | | 0 | 1 | 0 |
| 24 | | 0 | 0 | 0 | 1 | 0 | 0 | | | 1 | 0 | 0 | | 0 | 1 | 1 |
| 25 | | 0 | 0 | 1 | 1 | 0 | 1 | | | 1 | 0 | 1 | | 1 | 0 | 0 |
| 26 | | · | · | · | · | · | · | | | 1 | 1 | 0 | | 1 | 0 | 1 |
|    | | · | · | · | · | · | · | | 0 | 1 | 1 →RESET 1 1 1 | | | 1 | 1 | 0 |
|    | | | | | · | · | · | | 0 | 0 | 0 →RESET 1 1 1 | | | 1 | 1 | 1 →RESET 0 0 0 |
|    | | | | | | | | | 0 | 0 | 1 | | · | · | · |

INVENTOR:
WILLIAM F. SHOOP,
BY
AGENT.

3,393,366
HIGH PRECISION MOTOR SPEED CONTROL CIRCUIT UTILIZING BINARY COUNTERS AND DIGITAL LOGIC
William F. Shoop, Los Angeles, Calif., assignor, by mesne assignments, to TRW Inc., a corporation of Ohio
Filed June 5, 1964, Ser. No. 373,009
8 Claims. (Cl. 328—48)

ABSTRACT OF THE DISCLOSURE

There is disclosed a precise control system for constant speed electric motors useful in computer techniques. According to the present invention, motor speeds may be controlled with an accuracy of .05% by developing a crystal signal of 1.4336 megacycles and passing the signal through a ten stage binary counter to have a nominal output rectangular waveform of 1400 c.p.s. The output rectangular waveform is corrected to 1600 c.p.s. by resetting once every cycle the seventh stage of the counter system. Small errors may be corrected by resetting the first or second stages with the reset of the first stage accomplishing a change of slightly less than .05% per cycle of the output frequency. This motor speed control technique may have useful application in timing devices necessary for space vehicles or other computer work.

---

Figure 1:
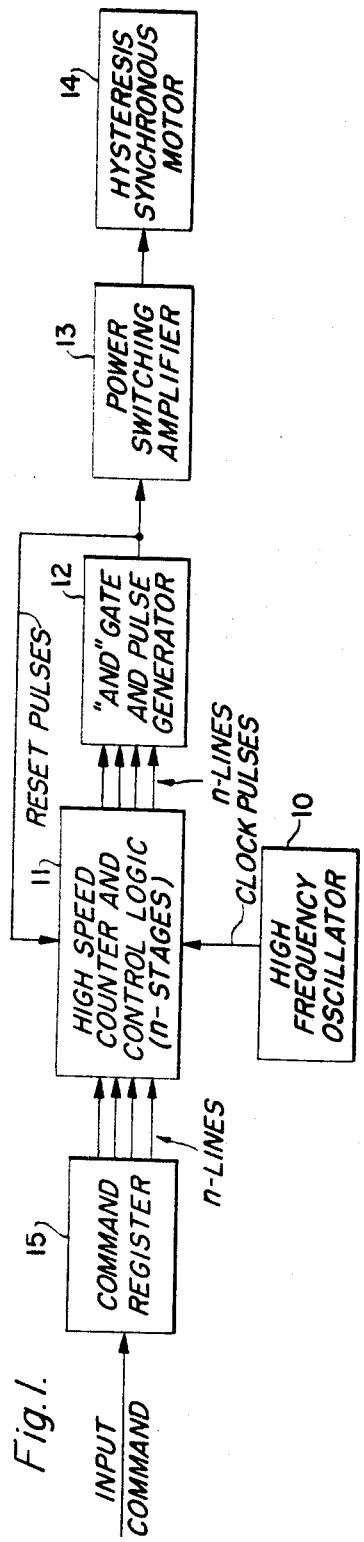

This invention relates to a system for digitally controlling the output of a very stable oscillator in which the output frequency is a function of an input command signal and the stability of the output frequency is determined by the stable oscillator.

The invention is best understood when applied to a specific application of controlling the speed of a hysteresis synchronous motor which is in direct proportion to the period of the voltage applied to the motor.

The variable frequency motor control system to be described is basically a digitally controlled variable frequency oscillator whose output pulse frequency is a function of an input command to the system. Frequency modulated pulses, after suitable shaping and power amplification, are applied to the windings of a two phase hysteresis synchronous motor. The speed of the motor is therefore controlled by the input command in an open loop circuit. A variety of auxiliary feedback loops may be utilized with the system to perform various types of control functions.

In the past, conventional methods of precision motor speed control have required such circuitry as A.C. amplifiers, demodulators, D.C. amplifiers, power amplifiers, precision summing networks, tachometers and temperature control circuitry. In the design of these various circuits for conventional motor speed control, the matching of transistors for D.C. amplifiers is a constant problem requiring antidrift circuits in order to obtain the desired stability and accuracy. In those systems using a variable frequency oscillator the accuracy is limited by the smallest increment of resistance, capacitance, or inductance that can be switched in or out of the frequency controlling circuit.

This invention is concerned with a system that approximates an ideal A.C. drive insofar as accuracy of speed control, stability, and the ease of control are concerned. There is employed a high speed digital counter and logic circuit for accurately controlling the speed of a hysteresis synchronous motor by generating a plurality of digitally selected output frequencies. Theoretically, the only limiting factors controlling the degree of accuracy of the digital speed control are the motor characteristics and the stability of the high frequency oscillator used as the clock pulse source. The precision obtainable is inherent in the motor itself in that, if a synchronous motor is supplied with a precision frequency, the motor runs at a precise speed. The same order of precision could be obtained by operating a synchronous motor from the output of a stable, variable frequency oscillator. Variation or "control" of the speed of the synchronous motor in the prior art is obtained by turning the dial on the oscillator. The output pulse frequency in this invention is controlled by digital means. By proper selection of the crystal frequency, number of countdown stages, and motor poles, the least increment of variation can be made as small as desirable, and is not limited to the smallest increment of resistance, capacitance, or inductance, which can be switched in or out of the circuit as mentioned above. The variable frequency control is obtained from a frequency stable oscillator arranged to generate and feed clock pulses to a high speed counter having a plurality of many stages. An AND gate receives an output from each stage which generates an output pulse when all stages are in the same state, for example, true. The output pulse is used to reset selected stages of the high speed counter. The output pulse will therefore be at a frequency determined basically by those stages which are selected to be reset.

In other words in a binary system having $n$ stages in the high speed counter it is possible to select $2^n$ number of output frequencies. By also changing the oscillator frequency it becomes possible to digitally select any desired frequency.

Figure 2:
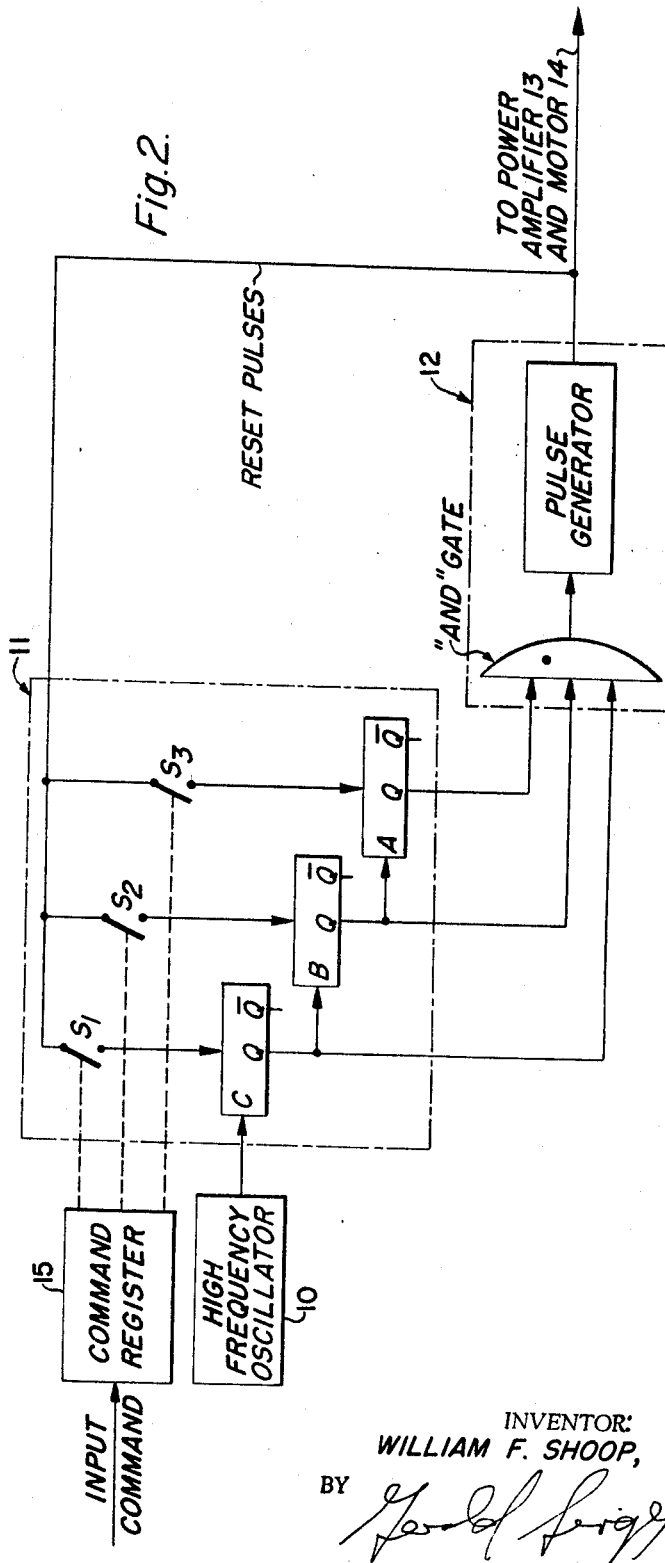

Further objects and advantages will be made more apparent by referring now to the accompanying drawings wherein:

FIG. 1 is a block diagram of a motor control system;
FIG. 2 illustrates how the command register controls the logic portion of the high speed counter; and
FIG. 3 is a table illustrating the command register control over the output pulse frequency.

Referring now to FIG. 1, there is shown a digitally controlled synchronous motor system comprising a high frequency oscillator 10 arranged to generate and feed clock pulses to a high speed counter 11 having a plurality of stages. An AND gate 12 arranged to receive an output from each stage of the counter 11 is arranged to generate an output pulse when all stages of the counter 11 are in the same state (full condition). The output pulse of the AND gate 12 feeds both a power switching amplifier 13 which drives a motor 14 and also feeds back a reset pulse to the counter 11. The reset pulse will reset only those selected stages of the counter 11 which are selected by a command register 15. By controlling the reset state of each stage of the high speed counter 11, the command register 15 controls the number of high frequency oscillator pulses required to fill the high speed counter and thereby controls the frequency of generation of output pulse and/or reset pulses. Depending on the input command controlling the command register 15, it is possible to select a plurality of discrete frequencies at the output of gate 12 depending only on the number of stages comprising counter 11. In a binary system this becomes $2^n$ frequency selections.

The range over which the output pulse frequency for controlling the motor 14 can conveniently be controlled is dependent only upon the frequency and stability of the clock pulses generated by the oscillator 10 and the number of stages in the counter 11. For instance, it is possible to obtain a controlled pulse frequency range of 2.5 megacycles per second to one pulse every ten days or longer with an accuracy of about 0.001 percent. No special circuitry is required to implement this dynamic range of $10^{12}$. The smallest discrete step of pulse frequency variation is only dependent upon the frequency of the cock pulse generated by the oscillator 10. The lowest output pulse frequency obtainable is dependent upon the clock pulse frequency and the number of binary stages in the countdown chain.

Referring now to FIG. 2, there is shown a more detailed version of the block diagram illustrated in FIG. 1. For simplicity and ease of explanation, the high speed counter is illustrated as having three flip-flop stages A, B, and C, in which stage C represents the lowest significant digit (LSD). Switches $S_1$, $S_2$, and $S_3$ control the feedback of reset pulses to stages C, B, and A, respectively and are separately controllable by the command register 15.

The outputs from stages A, B, and C are fed to the AND gate portion of block 12. To illustrate the operation of the device, consider the system of three flip-flops shown in FIG. 2. For the time being, assume that the switches $S_1$, $S_2$, and $S_3$ are open and controlled by the command register 15. If the input clock pulse from oscillator 10 occurs once each second, then the output reset pulse occurs each 8 seconds corresponding to the condition $Q_A = Q_B = Q_C = 1$. This condition is illustrated in Table I as Case 1. The output frequency is determined by the coincidence of outputs from stages A, B, and C into the AND gate which generate the reset pulse. In other words, the period of the output frequency is determined by the time between reset pulses identified in Table I, Case 1 by the word reset. Control of the frequency of the reset pulse is accomplished by use of the switches $S_1$, $S_2$ and $S_3$ (FIG. 2). These switches allow the reset pulse to prematurely change the state of the flip-flop stages A, B, and C so that after occurrence of the reset pulse the counter is not completely full (111). In Table I, Case 2 illustrates the change in frequency with $S_1$ and $S_2$ closed while Case 3 illustrates only $S_3$ closed.

Considering, for example, Case 3 in which only switch $S_3$ is closed, the "anded" output generates a reset pulse which is fed back to trigger the flip-flop stage A thereby causing $Q_A$ to equal 0. The number then held in the Q register would be three (011). Continuing at the same clock pulse counting rate, a doubling of the "anded" output reset pulse frequency would therefore be obtained. Similarly, if all the switches were closed, as shown in Case 4, the output reset pulse would change the state of all the flip-flops so that $Q_A = Q_B = Q_C = 0$ each time a reset pulse occurs. The output pulse frequency would then be $8/7$ of the normal output pulse frequency. "Normal" refers to that operating condition during which no reset pulse is applied to the binary elements of the flip-flop register. When all flipflops are set to zero by the reset pulse, the minimum change in output frequency will be the $8/7 \times 1/8 - 0.143 - 0.125 = 0.018$ c.p.s., or a resolution of $(0.018/0.125) \times 100 = 14.4$ percent. By increasing both the frequency of the clock pulse and the number of binary elements, the number of discrete frequencies on motor speeds, and therefore the resolution can be increased by any desired amount. It is evident that by controlling the position of the switches in FIG. 2, the output pulse frequency rate may also be controlled. These switches may, of course, be replaced by diode gates which form the command register 15.

As shown in FIG. 3, an output reset pulse is obtained from the pulse gate every time all of the inputs to the $n$-stage gate ($n=3$ in this example) are in the high or 1 condition. Assuming the clock pulse frequency is one cycle per second, the output frequency of reset pulses would be $1/8$ c.p.s. with no error in the command register. If, however, the contents of the command register were 101, as shown in Case 2 (FIG. 3), the reset point of the counter will be 010. Ordinarily, three pulses are required to change the state of the counter from 111 to 010 utilizing the method presented. Since three fewer pulses are required to cause the counter to reach the full condition, the output reset pulse frequency is now $1/5$ c.p.s.

As indicated in FIG. 3, the time between any two reset pulses is 2 words constant with the exception of the first period, since the counter starts at a zero condition. This, however, need not be the case if the command is initially set into the counter. In the worst case, however, no (initial reset), the condition of unequal periods occurs only once, that time being at initial turn-on of the entire system.

This completes the description of the embodiments of the invention disclosed and illustrated herein. However, many modifications and advantages will be apparent to persons skilled in the art without departing from the spirit and scope of this invention.

The embodiments of the invention in which an exclusive property or privilege is claimed are defined as follows:

1. In combination:
a frequency stable oscillator arranged to generate and feed clock pulses to a high speed counter having a plurality of stages,
means for coincidentally detecting similar outputs from each of said stages and generating an output pulse, and
means for resetting selected stages of said high speed counter with said output pulse whereby said output pulse is at a frequency determined by the selected stages being reset.

2. In combination:
a frequency stable oscillator arranged to generate and feed clock pulses to a high speed counter having a plurality of stages,
a coincident detector responsive to receiving similar outputs from each of said stages for generating an output pulse, and
means for resetting selected stages of said high speed counter with said output pulse whereby said output pulse is at a frequency determined by the selected stages being reset.

3. In combination:
a frequency stable oscillator arranged to generate and feed clock pulses to a high speed counter having a plurality of individual binary stages,
an AND gate connected to each of said stages and arranged to generate output pulse upon receiving similar outputs from each of said stages, and
means for resetting selected stages of said high speed counter with said output pulse whereby said output pulse is at a frequency determined by the selected stages being reset.

4. In combination:
a frequency stable oscillator arranged to generate and feed clock pulses to a high speed counter having a plurality of stages,
means for coincidentally detecting similar outputs from each of said stages and generating an output pulse,
means for resetting selected stages of said high speed counter with said output pulse, and
means for individually selecting stages of said counter to thereby determine the frequency of said output pulses.

5. In combination:
a frequency stable oscillator arranged to generate and feed clock pulses to a high speed counter having a plurality of individual binary stages,
an AND gate connected to each of said stages and arranged to generate output pulse upon receiving similar outputs from each of said stages,
and a command register responsive to a frequency control command for individually selecting stages of said counter to thereby determine the frequency of said output pulses.

6. A motor speed control comprising:
a frequency stable oscillator arranged to generate and feed clock pulses to a high speed counter having a plurality of stages,
means for coincidentally detecting similar outputs from each of said stages and generating an output pulse, means for generating a motor driving signal from said output pulses and driving a hysteresis synchronous motor, and means for resetting selected stages of said high speed counter with said output pulse whereby said output pulse is at a frequency determined by the selected stages being reset.

7. A motor speed control comprising:

a frequency stable oscillator arranged to generate and feed clock pulses to a high speed counter having a plurality of stages, an AND gate connected to each of said stages and arranged to generate output pulse upon receiving similar outputs from each of said stages, means for generating a motor driving signal from said output pulses and driving a hysteresis synchronous motor, and means for resetting selected stages of said high speed counter with said output pulse whereby said output pulse is at a frequency determined by the selected stages being reset.

8. A motor speed control comprising:

a frequency stable oscillator arranged to generate and feed clock pulses to a high speed counter having a plurality of stages, a coincident detector responsive to receiving similar outputs from each of said stages for generating an output pulse, means for resetting selected stages of said high speed counter with said output pulse, and a command register responsive to a frequency control command for individually selecting stages of said counter to thereby determine the frequency of said output pulses.

References Cited
UNITED STATES PATENTS

| | | | |
|---|---|---|---|
| 3,028,551 | 4/1962 | Secretan | 328—48 X |
| 3,096,483 | 7/1963 | Ransom | 328—48 |
| 3,281,635 | 10/1966 | Hohne | 318—341 X |

ARTHUR GAUSS, *Primary Examiner.*

ROBERT H. PLOTKIN, *Assistant Examiner.*